United States Patent
Soloviev

(10) Patent No.: US 7,075,517 B2
(45) Date of Patent: Jul. 11, 2006

(54) ENHANCED METHOD AND USER INTERFACE FOR CONTROLLING RADIO COMMUNICATIONS EQUIPMENT BY UTILIZING A WHEEL MOUSE

(75) Inventor: Dmitri Soloviev, Santa Clara, CA (US)

(73) Assignee: Networkfab Corporation, Santa Clara, CA (US)

( * ) Notice: Subject to any disclaimer, the term of this patent is extended or adjusted under 35 U.S.C. 154(b) by 465 days.

(21) Appl. No.: 10/663,569

(22) Filed: Sep. 16, 2003

(65) Prior Publication Data

US 2004/0085296 A1 May 6, 2004

Related U.S. Application Data

(60) Provisional application No. 60/410,922, filed on Sep. 16, 2002.

(51) Int. Cl.
*G09G 5/08* (2006.01)
(52) U.S. Cl. .................. 345/163; 345/157; 715/856
(58) Field of Classification Search ............ 345/157, 345/163, 167, 184, 173; 715/856, 830, 831; 200/179; 341/25; 455/412.1, 550.1; 340/995.15
See application file for complete search history.

(56) References Cited

U.S. PATENT DOCUMENTS

| 6,128,006 | A | * | 10/2000 | Rosenberg et al. | 345/163 |
| 6,154,201 | A | * | 11/2000 | Levin et al. | 345/184 |
| 6,310,613 | B1 | * | 10/2001 | Tanaka et al. | 345/173 |
| 2003/0222925 | A1 | * | 12/2003 | Regelous | 345/856 |

FOREIGN PATENT DOCUMENTS

CA 2429660 A1 * 11/2003

* cited by examiner

*Primary Examiner*—Xiao Wu
*Assistant Examiner*—Kevin M. Nguyen
(74) *Attorney, Agent, or Firm*—Steins & Associates, P.C.

(57) ABSTRACT

An Enhanced Method and User Interface for Controlling Radio Communications Equipment by Utilizing a Wheel Mouse is disclosed. The user interface method of this invention utilizes a wheel mouse in concert with specialized software to intuitively control the radio device by addressing individual characters in a field, with downward independency and upward dependency. This invention provides the most efficient and unique radio equipment control interface today.

14 Claims, 2 Drawing Sheets

ENHANCED METHOD AND USER INTERFACE FOR CONTROLLING RADIO COMMUNICATIONS EQUIPMENT BY UTILIZING A WHEEL MOUSE

This application claims priority to provisional application Serial No. 60/410,922, filed Sep. 16, 2002.

BACKGROUND OF THE INVENTION

1. Field of the Invention

This invention relates to a far more efficient and intuitive user interface method of operating radio communications equipment than is normally done today, more specifically, to an Enhanced Method and User Interface for Controlling Radio Communications Equipment by Utilizing a Wheel Mouse.

2. Description of Related Art

Control of radio equipment has classically been done by manually operating the front panel buttons and knobs. More recent versions of radio equipment are operable by a control software program running on a computer that is attached to the radio. The invention described herein takes this latter modern control method one step further.

The technique of this invention is a more sophisticated method and apparatus for intuitively controlling radio equipment. In particular, this invention is applicable to the enhanced use and operation of radio receivers. The invention utilizes a wheel mouse in concert with sophisticated user interface software for the most efficient and intuitive receiver control interface yet today. The unique interface of this invention affords a direct mapping of operator input to expected responses or outcomes. The concept and method of leveraging wheel mouse functions to control radio receiver equipment is unique in the radio industry. The invention is used for intuitive frequency tuning, spectral display controls, changing of parameter values, and real-time updating of receiver control settings.

It is an object of the present invention to provide an improved method and apparatus for the control of radio communications equipment. Use of this invention will greatly enhance operations, as well as minimize radio operator training.

SUMMARY OF THE INVENTION

In light of the aforementioned problems associated with prior systems and methods, it is an object of the present invention to provide an improved method and apparatus for the enhanced control of radio communications equipment. The user interface method of this invention utilizes a wheel mouse in concert with specialized software to intuitively control the radio device. This invention provides the most efficient and unique radio equipment control interface today.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Enhanced Method and User Interface for Controlling Radio Communications Equipment by Utilizing a Wheel Mouse.

Figure 1:
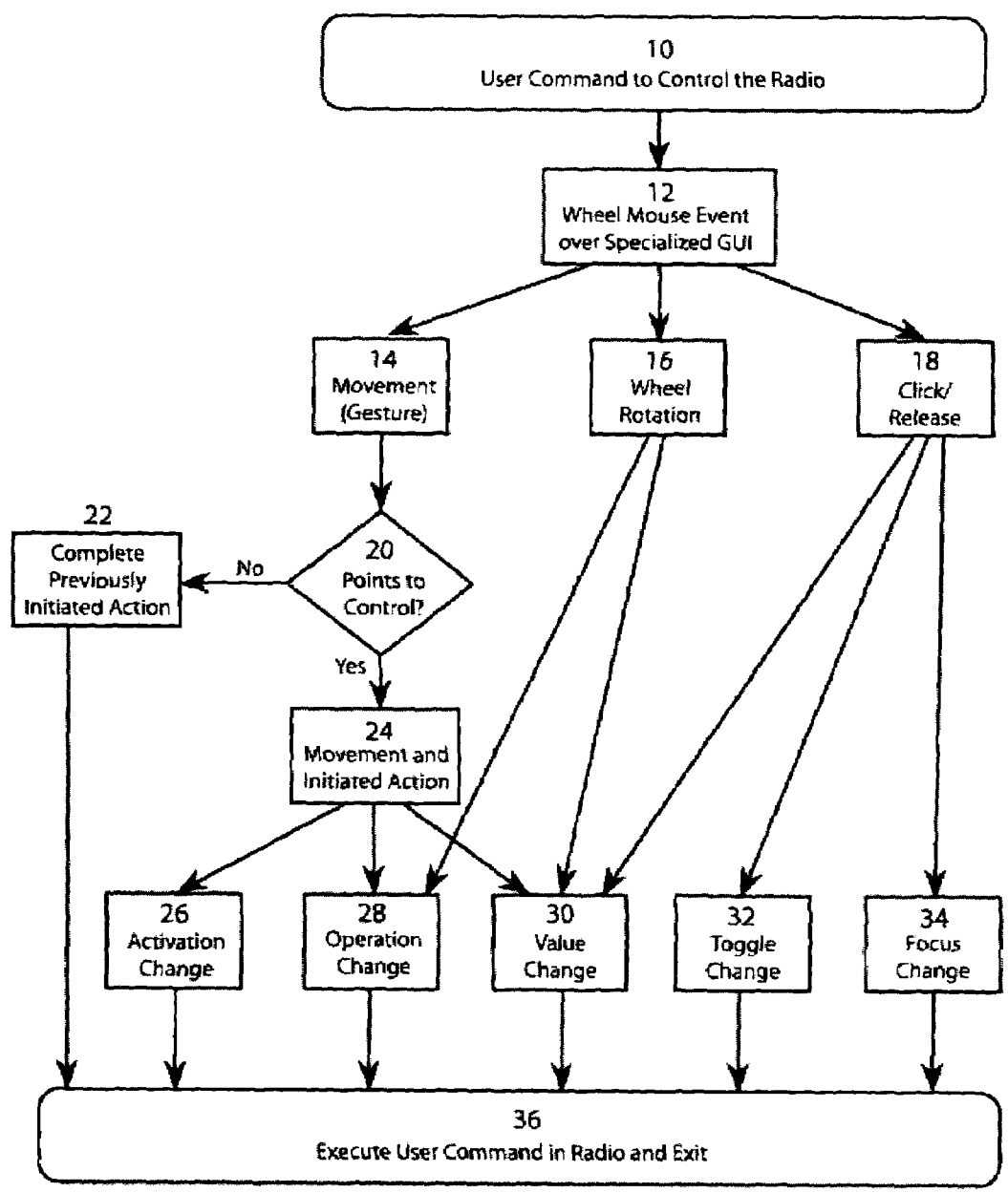
FIG. 1 is flow chart diagram of the invention. This drawing shows the decision process of the unique control interface of utilizing a wheel mouse to control radio communication devices.

The present invention can best be understood by initial consideration of FIG. 1. FIG. 1 is flow chart diagram of the invention. This drawing shows the decision process of the unique control interface of utilizing a wheel mouse to control radio communication devices.

General Description

The invention utilizes wheel mouse functions and specialized software to interface with the radio equipment. The software runs on a computer that is attached to the radio device. The software displays all the settings, parameters, and spectral outputs of the radio device. The wheel mouse functions are mapped to the radio controls and used to interact with this software GUI for an interactive user interface.

This method of using wheel mouse functions has the following enhanced user interface features: (1) The ability to change the radio's frequencies, in real-time, up or down by pointing the mouse over a numerical display of the present frequency, and then rotating the wheel up or down accordingly; (2) The ability to change the radio's settings, in real-time, up or down by highlighting the present value and then rotating the mouse wheel up or down accordingly; (3). The ability to click and zoom in on a display of the radio's received spectrum; (4) The ability to show updates, in real-time, of changed radio settings as they are being commanded; and (5) The ability to change the scaling of the radio's spectrum display, in real-time, up or down by rotating the mouse wheel up or down accordingly.

It should be reiterated and understood that present-day receiver control software programs do not utilize such innovative wheel mouse features. Thus the user interfaces of today are more crude, less intuitive, and require more manual commands to execute various controls.

DIAGRAM REFERENCE NUMERALS

10 User Command to Control the Radio
12 Wheel Mouse Event of Specialized GUI
14 Wheel Mouse Movement/Gesture
16 Wheel Rotation
18 Wheel Mouse Click and Release
20 Decision Box: Points to Control?
22 Complete Previous Initiated Action
24 Movement and Initiated Action
26 Activation Change
28 Operation Change
30 Value Change
32 Toggle Change
34 Focus Change
36 Execute User Command in Radio Operation The application software GUI of this invention is loaded on a computer that is connected to the radio device. This application contains controls which when commanded by wheel mouse events, creates a direct mapping of those wheel mouse functions to the radio's native command protocols. The following paragraphs outline some of the embodiments of this invention, namely, the wheel mouse interactions with the radio device.

The aforementioned software application has the ability to display the radio's numerical frequency setting. To change the radio's frequencies in real-time, the wheel mouse is pointed over a digit on this frequency display. The operator then performs a Wheel Rotation 16 up to increase the frequency digit, or down to decrease the frequency digit. These commands 10 continually reprogram the radio as the wheel is moved. In FIG. 1, these changes are represented by Value Changes 30.

The invention is also used to change the radio's various settings such as squelch value, attenuation value, dwell timers, etc. These changes can be done in real-time by highlighting the present value on the software display with the wheel mouse (Movement 14 of FIG. 1), and then performing a Wheel Rotation 16 up or down to change the radio's setting value accordingly.

One of the most useful embodiments of this invention is the ability to use the wheel mouse to "click-and-drag" across a display of a radio's received spectrum. This process automatically controls the radio to sweep through the updated range. The result is that the spectrum display, as shown by the software GUI, functionally zooms in on the radio's received spectrum according to the wheel mouse event. In FIG. 1, Movement 14 is used to make this Operation Change 28. Alternatively, if the operator wishes to cancel the operation during this process, decision box 20, then Movement 14 is followed by box 22 where the GUI continues in its previous setting.

Another embodiment of this invention is the ability to display to operators, the radio settings as they are being changed by the wheel mouse in real-time. For example, the software application can display the radio's tuned frequency graphically on a picture of the spectrum. This frequency appears as a vertical line on the graph, where the horizontal scale indicates the frequency range. The operator can then place the cursor of the wheel mouse over this frequency line, click and hold the left mouse button, and drag the line across the graph, represented by the wheel mouse event 18 in FIG. 1. During this process, a real-time indicator of the changing frequencies appears on the graph. When the mouse button is released, the radio device will then automatically tune to that new setting. Furthermore, if the wheel button of the mouse is rotated up, the frequency line moves higher on the graph. If the wheel button of the mouse is rotated down, the frequency line moves to a lower setting on the graph. Using a wheel mouse is an extremely intuitive way to control the radio device's frequency setting across a spectrum display. This is unique in the industry.

Yet another embodiment of the invention is the ability to change the scaling of the radio's spectrum display, in real-time, up or down by rotating the mouse wheel up or down accordingly. This process will cause the graph of the display to constantly update as the scales are changed by the wheel mouse commands. The interactivity of allowing an operator to adjust the scales of the views by moving the wheel mouse up or down is very intuitive and useful.

Figure 2:
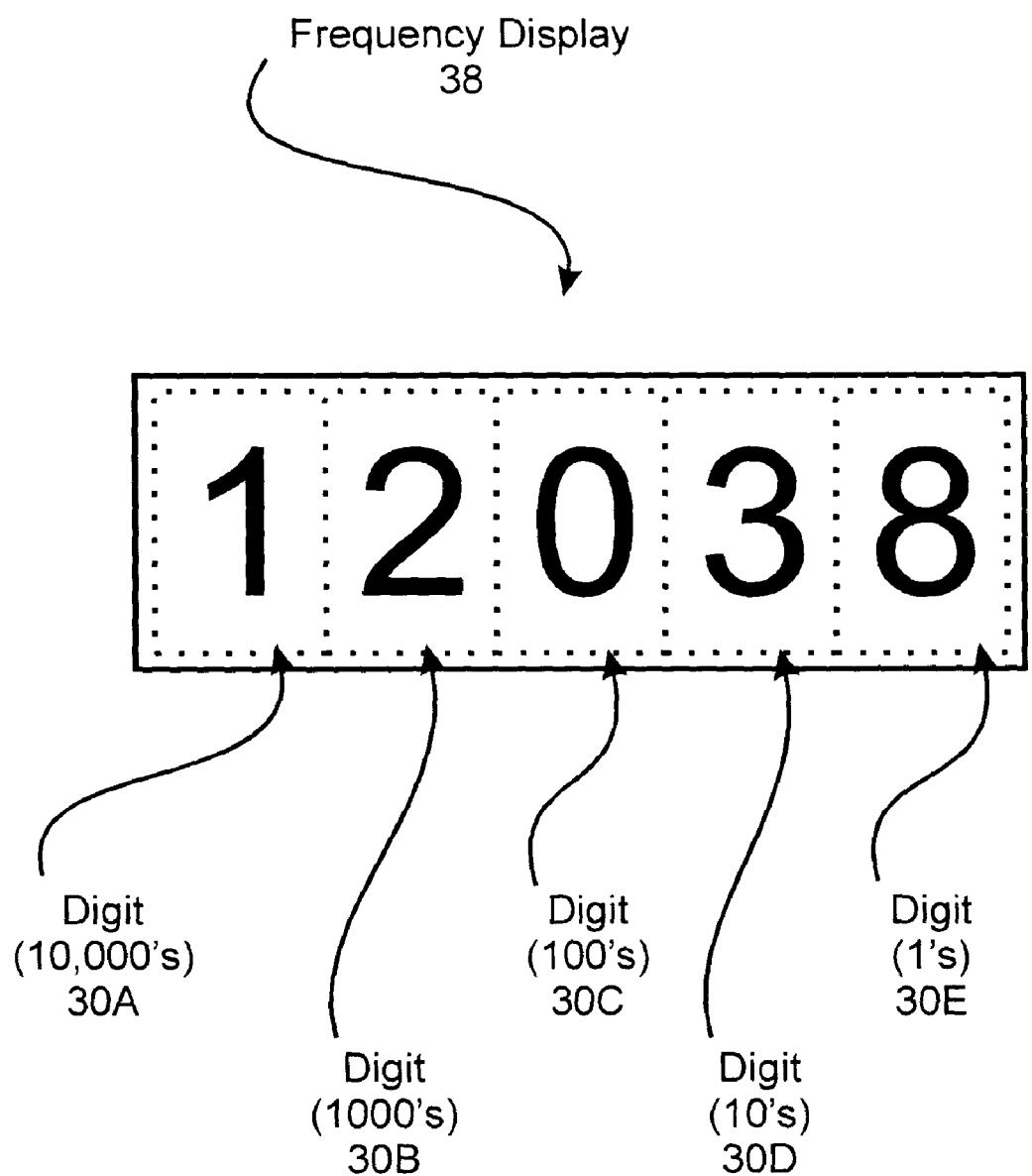
FIG. 2 is a diagram of a preferred graphical user interface for the present invention.

FIG. 2 depicts the preferred frequency field 38 of the present invention wherein individual digits 30 can be addressed semi-independently. As discussed above, if the user wishes to change the frequency, he or she simply "hovers" (also known and described above as "pointing") and moves the wheel on the mouse up or down to adjust the individual digits 30 independently. For example, the user could hover the pointer above the "0" in the 100's digit 30C and wheel up or down to immediately adjust it without "clicking" the mouse button or otherwise selecting the digit 30C. When adjusting the 100's digit 30C (in this example), the 10's and 1's digits 30D and 30E are not changed at all. The 1000's digit 30B, however, is dependent; that is to say that when the user uses wheel rotation to go past 9 incrementing up to 0, the 1000's digit will increment, and when the user goes down past 1 decrementing to 0, the 1000's digit will decrement.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of providing a user interface for controlling radio equipment, the method being implemented in a programmed computer comprising a processor, at least one data storage system, a wheel mouse input device defined by a wheel and at least one display device, the method comprising the steps of:

generating, by means of the programmed computer, a graphical user interface, said graphical user interface comprising at least one frequency field defined by at least a first and a second digit field, and a mouse pointer;

displaying said graphical user interface on one said display device;

accepting input from a user, said user manipulating said wheel mouse input device to place said mouse pointer over one said digit field and manipulating said wheel without clicking said mouse to select a desired digit displayed in said digit field over which said mouse pointer is placed;

converting said accepted input into a frequency command to said controlled radio equipment.

2. The method of claim 1, wherein said accepting step comprises accepting input from a user, said user manipulating said wheel mouse input device to place said mouse pointer over one said digit field and manipulating said wheel without clicking said mouse to select a desired digit displayed in said digit field over which said mouse pointer is placed, said other digit field displayed digit changing responsive to said digit displayed in said digit field over which said mouse pointer is placed.

3. The method of claim 2, wherein:

said generating step comprises generating, by means of the programmed computer, a graphical user interface, said graphical user interface comprising at least one frequency field defined by at least a first, a second, and a third digit field, and a mouse pointer; and said accepting step comprises accepting input from a user, said user manipulating said wheel mouse input device to place said mouse pointer over said second digit field and manipulating said wheel without clicking said mouse to select a desired digit displayed in said second digit field, said first digit field displayed digit changing responsive to said digit displayed in said second digit field, said third digit field displayed digit not changing responsive to said digit displayed in said second digit field.

4. The method of claim 3, wherein:

said generating step comprises generating, by means of the programmed computer, a graphical user interface, said graphical user interface comprising at least one frequency field defined by at least a hundreds, a tens, and a units digit field, and a mouse pointer; and said accepting step comprises accepting input from a user, said user manipulating said wheel mouse input device to place said mouse pointer over said tens digit field and manipulating said wheel without clicking said mouse to select a desired digit displayed in said tens digit field, said hundreds digit field displayed digit changing responsive to said digit displayed in said tens digit field, said units digit field displayed digit not changing responsive to said digit displayed in said tens digit field.

5. The method of claim 4, wherein said converting step comprises converting said accepted hundreds, tens and units digits into a frequency command to said controlled radio equipment.

6. A method of providing a user interface for tuning electronic equipment, the method being implemented in a programmed computer comprising a processor, at least one data storage system, a wheel mouse input device defined by a wheel and at least one display device, the method comprising the steps of:

generating, by means of the programmed computer, a graphical user interface, said graphical user interface comprising at least one frequency field defined by at least a first and a second digit field, and a mouse pointer;

displaying said graphical user interface on one said display device;

accepting input from a user, said user manipulating said wheel mouse input device to place said mouse pointer over one said digit field and manipulating said wheel without clicking said mouse to select a desired digit displayed in said digit field over which said mouse pointer is placed;

converting said accepted input into a tuning command to said controlled electronic equipment.

7. The method of claim 6, wherein said accepting step comprises accepting input from a user, said user manipulating said wheel mouse input device to place said mouse pointer over one said digit field and manipulating said wheel without clicking said mouse to select a desired digit displayed in said digit field over which said mouse pointer is placed, said other digit field displayed digit changing responsive to said digit displayed in said digit field over which said mouse pointer is placed.

8. The method of claim 7, wherein:

said generating step comprises generating, by means of the programmed computer, a graphical user interface, said graphical user interface comprising at least one frequency field defined by at least a first, a second, and a third digit field, and a mouse pointer; and said accepting step comprises accepting input from a user, said user manipulating said wheel mouse input device to place said mouse pointer over said second digit field and manipulating said wheel without clicking said mouse to select a desired digit displayed in said second digit field, said first digit field displayed digit changing responsive to said digit displayed in said second digit field, said third digit field displayed digit not changing responsive to said digit displayed in said second digit field.

9. The method of claim 8, wherein:

said generating step comprises generating, by means of the programmed computer, a graphical user interface, said graphical user interface comprising at least one frequency field defined by at least a thousands, a hundreds, a tens, and a units digit field, and a mouse pointer; and said accepting step comprises accepting input from a user, said user manipulating said wheel mouse input device to place said mouse pointer over said tens digit field and manipulating said wheel without clicking said mouse to select a desired digit displayed in said tens digit field, said hundreds digit field displayed digit changing responsive to said digit displayed in said tens digit field, said units digit field displayed digit not changing responsive to said digit displayed in said tens digit field.

10. The method of claim 9, wherein:

said accepting step comprises accepting input from a user, said user manipulating said wheel mouse input device to place said mouse pointer over said hundreds digit field and manipulating said wheel without clicking said mouse to select a desired digit displayed in said hundreds digit field, said thousands digit field displayed digit changing responsive to said digit displayed in said hundreds digit field, said units digit field displayed digit and said tens digit field displayed digit not changing responsive to said digit displayed in said hundreds digit field.

11. The method of claim 10, wherein said converting step comprises converting said accepted hundreds, tens and units digits into a frequency command to said controlled radio equipment.

12. The method of claim 8, wherein:

said generating step comprises generating, by means of the programmed computer, a graphical user interface, said graphical user interface comprising at least one frequency field defined by at least a thousands, a hundreds, a tens, a units, and a tenths digit field, and a mouse pointer; and said accepting step comprises accepting input from a user, said user manipulating said wheel mouse input device to place said mouse pointer over said tens digit field and manipulating said wheel without clicking said mouse to select a desired digit displayed in said tens digit field, said hundreds digit field displayed digit changing responsive to said digit displayed in said tens digit field, said units and said tenths digit field displayed digit not changing responsive to said digit displayed in said tens digit field.

13. The method of claim 12, wherein:

said accepting step comprises accepting input from a user, said user manipulating said wheel mouse input device to place said mouse pointer over said units digit field and manipulating said wheel without clicking said mouse to select a desired digit displayed in said units digit field, said tens digit field displayed digit changing responsive to said digit displayed in said units digit field, said tenths digit field displayed digit not changing responsive to said digit displayed in said units digit field.

14. The method of claim 12, wherein:

said accepting step comprises accepting input from a user, said user manipulating said wheel mouse input device to place said mouse pointer over said hundreds digit field and manipulating said wheel without clicking said mouse to select a desired digit displayed in said hundreds digit field, said tenths digit field displayed digit, said units digit field displayed digit and said tenths digit field displayed digit not changing responsive to said digit displayed in said hundreds digit field.

* * * * *